US 7,080,957 B2

(12) United States Patent
Basinger

(10) Patent No.: US 7,080,957 B2
(45) Date of Patent: Jul. 25, 2006

(54) PIPE PULLER

(76) Inventor: Jon E. Basinger, 4080 E. Hookwaltz Rd., Elida, OH (US) 45807

( * ) Notice: Subject to any disclaimer, the term of this patent is extended or adjusted under 35 U.S.C. 154(b) by 0 days.

(21) Appl. No.: 11/167,971

(22) Filed: Jun. 28, 2005

(65) Prior Publication Data
US 2005/0281622 A1 Dec. 22, 2005

Related U.S. Application Data

(62) Division of application No. 10/870,615, filed on Jun. 17, 2004.

(51) Int. Cl.
F16L 1/00 (2006.01)
F16L 1/036 (2006.01)

(52) U.S. Cl. .................. 405/184.5; 405/154.1; 405/184; 414/745.4; 414/746.5

(58) Field of Classification Search ............ 405/154.1, 405/184.1, 184.5, 184, 170; 414/745.4, 745.5, 414/746.5
See application file for complete search history.

(56) References Cited

U.S. PATENT DOCUMENTS

| 1,195,147 | A | * | 8/1916 | Mitchell | 414/746.5 |
| 3,760,595 | A | | 9/1973 | Stewart et al. | |
| 3,958,704 | A | * | 5/1976 | Wire et al. | 414/746.5 |
| 4,209,269 | A | | 6/1980 | Martinez | |
| 4,384,636 | A | | 5/1983 | Hillemacher | |
| 4,594,027 | A | | 6/1986 | Becker | |
| 4,969,677 | A | | 11/1990 | Melegari | |
| 5,368,413 | A | * | 11/1994 | Moore | 405/184.5 |
| 5,653,293 | A | | 8/1997 | Ellis | |
| 6,227,765 | B1 | | 5/2001 | von Trepka | |

FOREIGN PATENT DOCUMENTS

DE 3404724 * 9/1985

* cited by examiner

Primary Examiner—Jong-Suk (James) Lee
(74) Attorney, Agent, or Firm—MacMillan, Sobanski & Todd, LLC

(57) ABSTRACT

An apparatus for pulling a first pipe into contact with a stationary second pipe includes a strut having a first end and second end. A force generating apparatus is mounted to the strut, and is configured for pulling the first pipe relative to the second pipe.

9 Claims, 10 Drawing Sheets

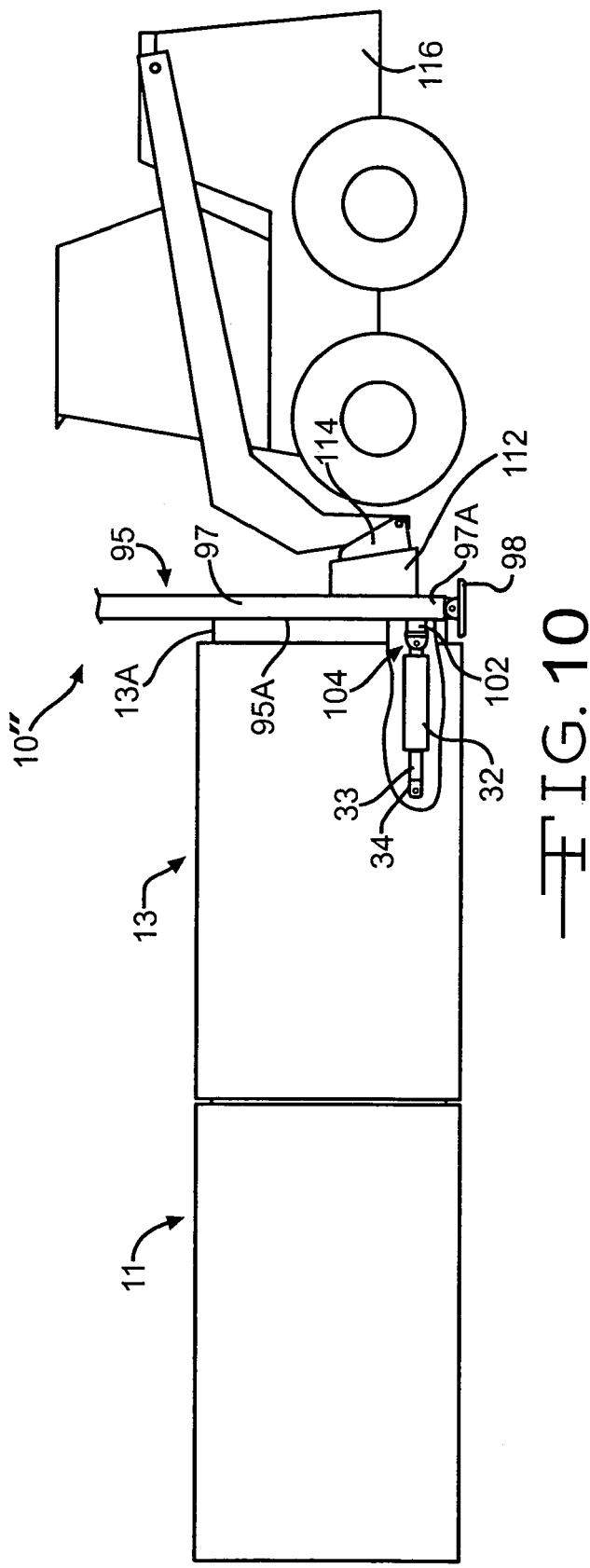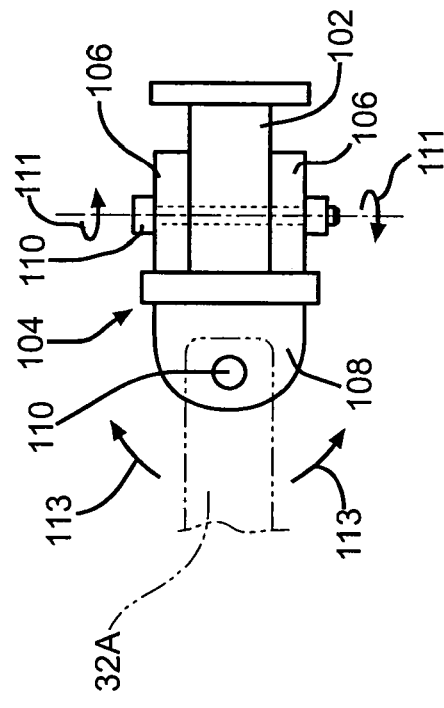

PIPE PULLER

CROSS REFERENCE TO RELATED APPLICATIONS

The present application is a division of co-pending U.S. patent application Ser. No. 10/870,615, entitled PIPE PULLER and filed Jun. 17, 2004, the disclosure of which is hereby incorporated by reference.

BACKGROUND OF THE INVENTION

The present invention relates generally to an apparatus for pulling a first pipe into contact with a stationary second pipe, and more particularly to an improved apparatus for pulling a first pipe into contact with a stationary second pipe.

Known apparatus for pulling pipe can be large, extremely heavy, expensive, and difficult to position within a pipe. It would therefore be advantageous to provide an improved apparatus for pulling pipe that is smaller, lighter, less expensive, and easier to use than known apparatus.

SUMMARY OF THE INVENTION

The present invention relates to an apparatus for pulling a first pipe into contact with a stationary second pipe. The apparatus includes a strut having a first end and second end. A force generating apparatus is mounted to the strut, and is configured for pulling the first pipe relative to the second pipe.

Other advantages of this invention will become apparent to those skilled in the art from the following detailed description of the invention, when read in light of the accompanying drawings.

BRIEF DESCRIPTION OF THE DRAWINGS

FIG. 10 is an elevational view of the apparatus for pulling pipe illustrated in FIG. 9 showing the apparatus in the second operating configuration adjacent an end of a pipe.

FIG. 10A is an enlarged elevational view of the pivot assembly illustrated in FIGS. 9 and 10.

DETAILED DESCRIPTION OF THE INVENTION

Figure 1:
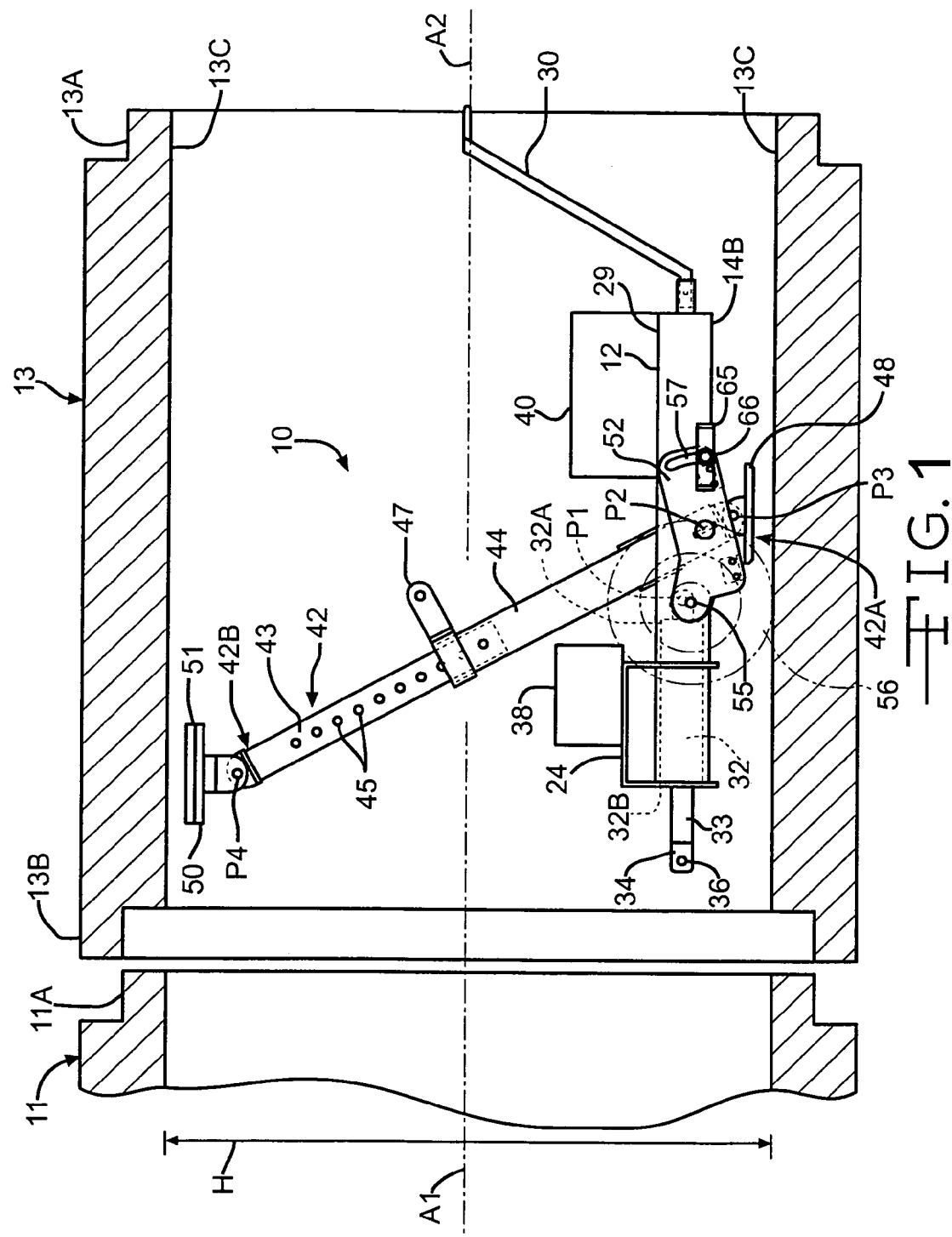
FIG. 1 is an elevational view of a first embodiment of an apparatus for pulling pipe in accordance with the present invention, with the apparatus inside a pipe and with the pipe illustrated in cross section.
Figure 4:
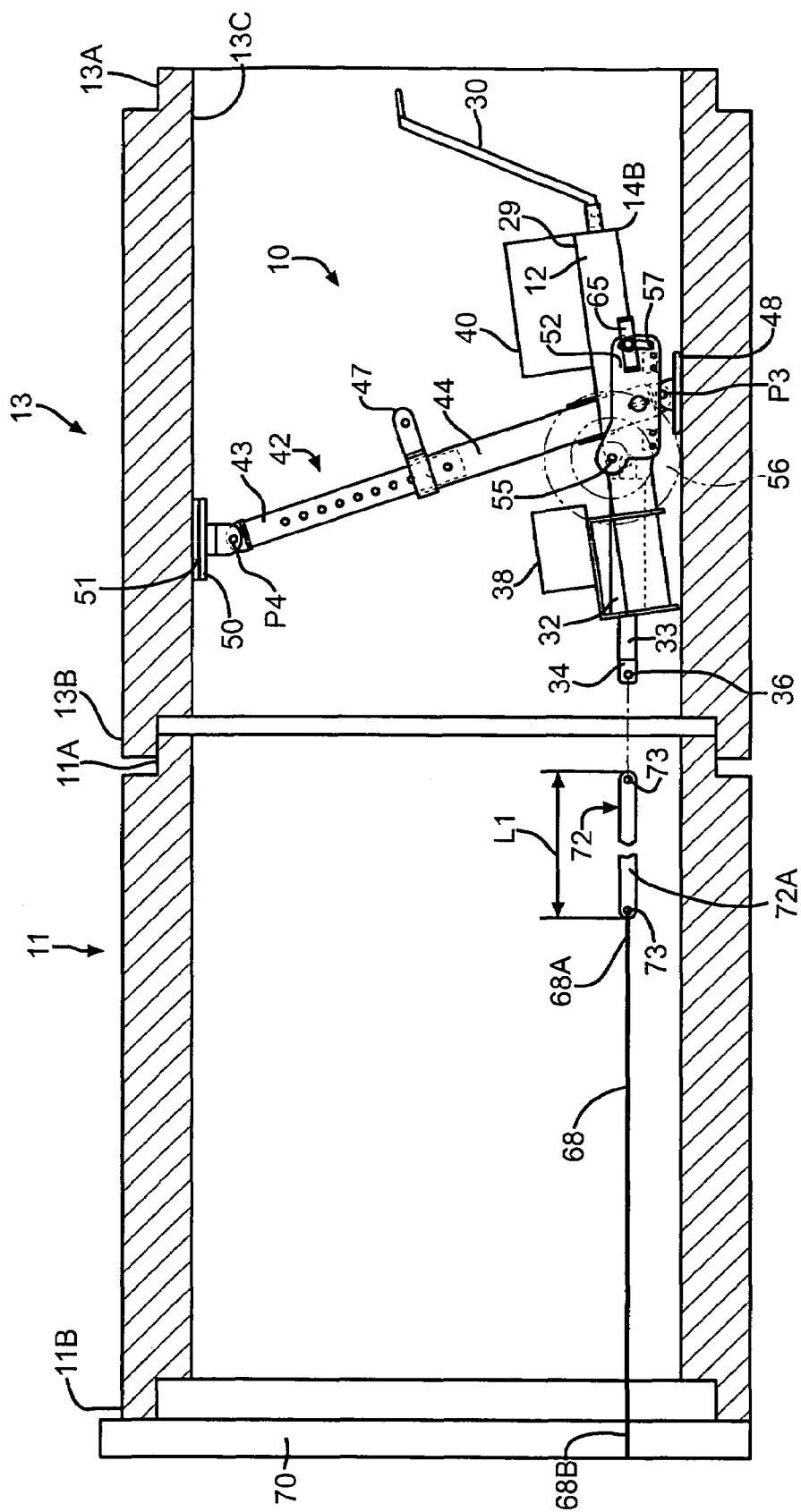
FIG. 4 is an elevational view of the apparatus for pulling pipe illustrated in FIG. 1, showing the apparatus in a first operating configuration inside a pipe illustrated in cross section.

Referring to FIG. 1, a first embodiment of an apparatus for pulling pipe, or a pipe puller, is illustrated generally at 10. As illustrated in FIG. 1, a first pipe 11 to be moved or pulled is disposed adjacent a stationary second pipe 13. Preferably a longitudinal axis A1 of the first pipe 11 and a longitudinal axis A2 of the second pipe 13 are substantially collinear. As best shown in FIG. 4, the first pipe 11 includes a first or male end 11A and a second or female end 11B, and the second pipe 13 includes a first or male end 13A, a second or female end 13B, and an inner surface 13C. The first and second pipes 11 and 13 have an inner diameter or height H. The pipe puller 10 is shown disposed within the stationary second pipe 13. It will be understood that as used herein, pipe is defined as any type of pipe, such as a culvert or sewer pipe, typically formed from concrete and having any cross-sectional shape and any cross-sectional area. For example, such a pipe can have a round, elliptical, or rectangular cross-sectional shapes.

Figure 2:
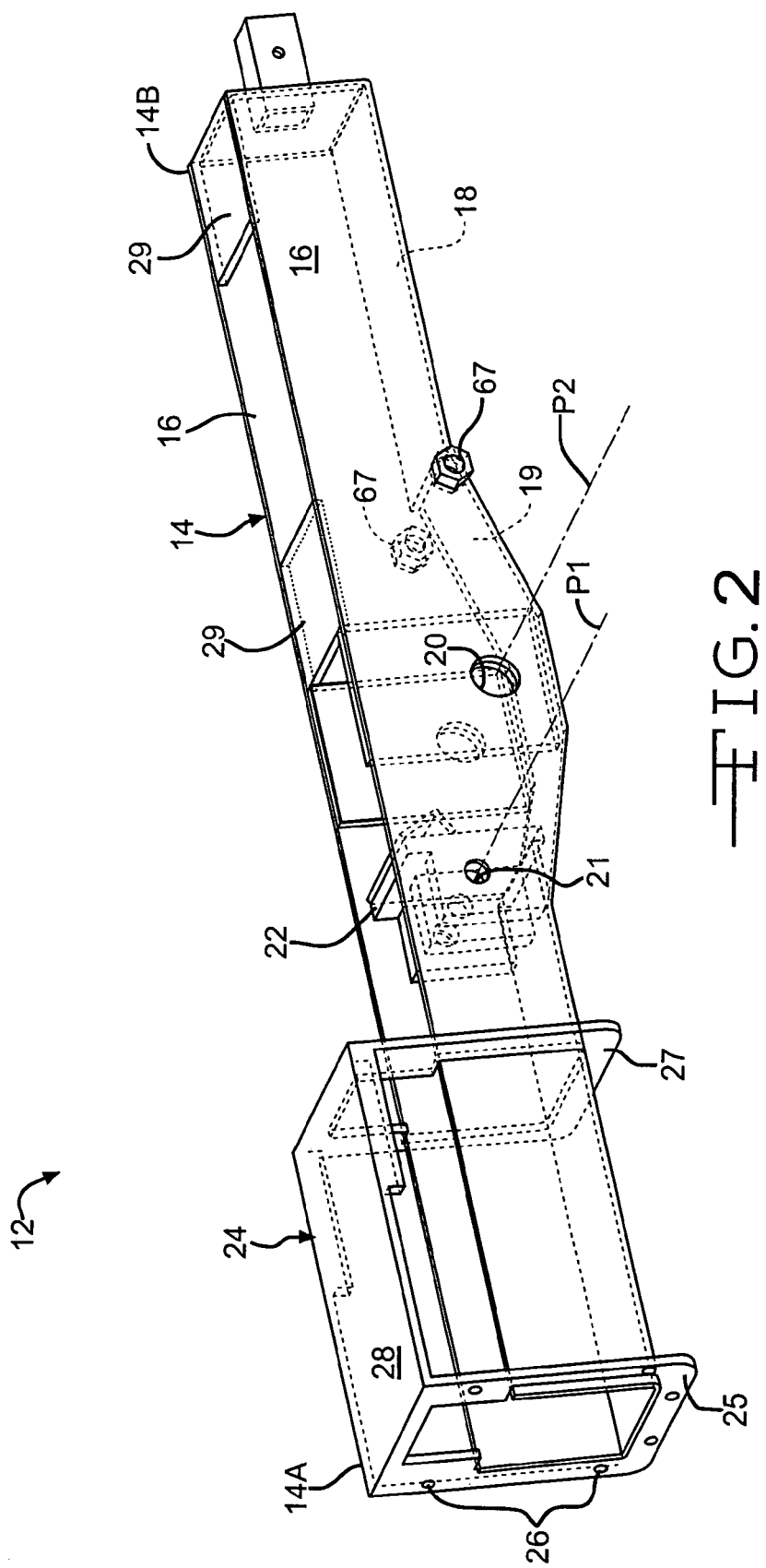
FIG. 2 is an enlarged perspective view of the frame illustrated in FIG. 1.

Referring to FIG. 2, the pipe puller 10 includes a frame 12. The frame 12 has a substantially elongated body 14 having a forward end 14A and a rearward end 14B. The frame body 14 has a substantially U-shaped cross section having substantially parallel side walls 16 and a bottom wall 18 extending between the side walls 16. Preferably, the bottom wall 18 includes an opening 19. First and second pivot apertures 20 and 21, respectively, are formed through the side walls 16, the purposes of which will be explained herein. A strut stop 22 extends between the side walls 16 forward of the first pivot apertures 20, as best shown in FIG. 2.

The forward end 14A of the body 14 includes an upwardly extending portion 24, as viewed in FIG. 2. The portion 24 includes a substantially U-shaped first mounting flange 25 disposed at the forward end 14A of the frame 12. The first mounting flange 25 includes a plurality of mounting apertures 26 formed therethrough. A substantially U-shaped second flange 27 is disposed about the frame 12 rearward of the first mounting flange 25. A first support surface 28 extends between the first mounting flange 25 and the second flange 27. A second support surface 29 extends between an upper edge of the side walls 16 of the rearward end 14B of the frame 12. Optionally, two second support surfaces 29 can be provided as shown in FIG. 2. Preferably, a frame handle 30 extends upwardly and rearwardly from the rearward end 14B of the frame 12. The frame 12 can be formed from any desired material, such as plate steel. Preferably, the frame 12 is formed from ⅜ inch plate steel. However, any other desired metals and non-metals can be used.

A force generating apparatus 32 is disposed at the forward end 14A of the frame body 14. Preferably, the force generating apparatus is a hydraulic jack 32 disposed between the side walls 16 of the frame 12 and pivotally mounted thereto about a first pivot axis P1. The hydraulic jack 32 includes a first end 32A and a second end 32B. A piston rod 33 extends outwardly from the second end 32B of the hydraulic jack 32. The piston rod 33 includes a first connecting member 34 at a distal end thereof. A connecting aperture 36 is formed in the connecting member 34.

A power unit 38 is disposed on the first support surface 28 of the portion 24 of the frame 12. Although illustrated schematically in FIGS. 1, 3, and 4, it will be understood that the power unit 38 can include a motor, such as a 12-volt electric motor, a hydraulic pump, a hydraulic fluid reservoir, and a hydraulic pressure gauge. A source 40 of power for powering the electric motor is disposed on the second support surface 29 at the rearward end 14B of the frame body 14. Preferably, the source 40 of power is a battery, such as a 12 volt battery.

Figure 5:
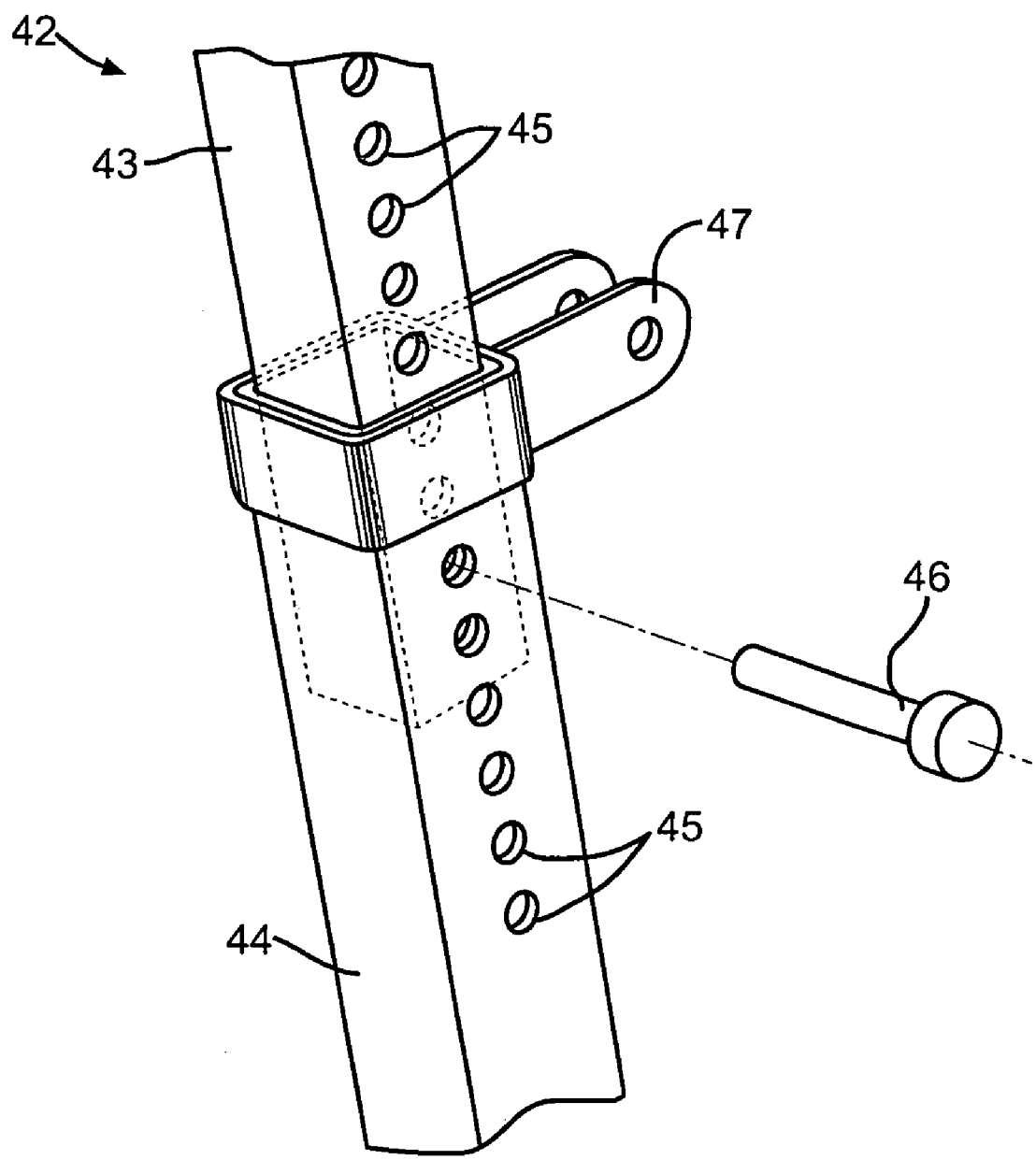
FIG. 5 is an enlarged perspective view of a portion of the strut illustrated in FIG. 1.

A strut 42 having a first end 42A and a second end 42B extends through the opening 19 in the bottom wall 18 of the frame 12. Preferably, the strut 42 is pivotally mounted to the side walls 16 of the frame 12 about a second pivot axis P2. Preferably the strut 42 is telescoping and includes an upper section 43 slidably disposed within a lower section 44, as best shown in FIG. 5. Transverse holes 45 are formed in the upper and lower sections 43 and 44 for receiving a locking bolt or pin 46. A lifting member 47 extends rearwardly from the lower section 44 for lifting the pipe puller 10 with a lifting apparatus (not shown). Preferably, the strut 42 is formed from steel, such as plate steel within the range of from about ¼ inch to about ⅜ inch thick. It will be understood however, that the strut 42 can be formed from any desired thickness of steel and any other desired metals and non-metals.

A first shoe 48 is pivotally mounted at the first end 42A of the strut about a third pivot axis P3. Preferably, the first shoe 48 is formed from steel, such as such as plate steel within the range of from about ¾ inch to about 1 inch thick. It will be understood however, that the first shoe 48 can be formed from any desired thickness of steel and any other desired metals and non-metals.

A second shoe 50 is pivotally mounted at the second end 42B of the strut 42 about a fourth pivot axis P4. Preferably, the second shoe 50 is formed from steel, such as plate steel within the range of from about ¾ inch to about 1 inch thick. It will be understood however, that the second shoe 50 can be formed from any desired thickness of steel and any other desired metals and non-metals. The second shoe 50 includes an outer layer 51 for engaging the inner surface 13C of the second pipe 13. Preferably, the outer layer 51 is formed from a material having a high coefficient of friction, such as rubber. However, the outer layer 51 can formed from any material suitable for preventing the second shoe 50 from sliding against the inner surface 13C of the second pipe 13.

Figure 6:
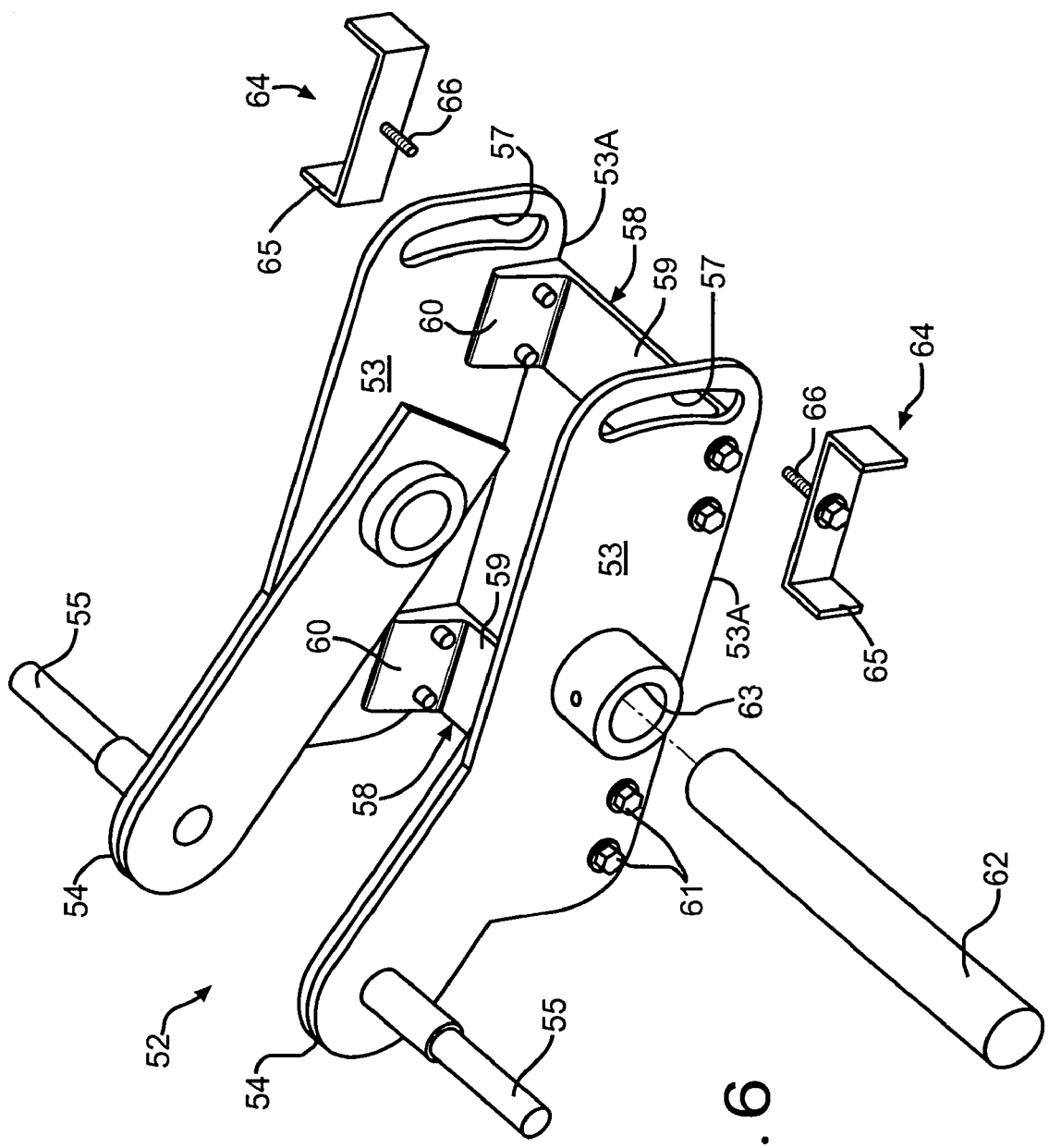
FIG. 6 is an enlarged perspective view of the pivot assembly illustrated in FIG. 1.

As best shown in FIG. 6 a first pivot assembly 52 includes substantially elongated side members 53. The side members 53 include a forwardly and upwardly extending wheel portion 54 (as viewed in FIG. 6). Axle members 55 extend outwardly from the wheel portions 54. Rotatable wheels 56 are mounted on the axle members 55, as best shown in FIG. 1. An arcuate slot 57 is formed in a rearward portion of each of the side members 53. At least one cross member 58 extends between lower edges 53A of the side members 53.

As shown in the exemplary embodiment illustrated in FIG. 6, the cross members 58 are substantially U-shaped and include a body 59 and two upwardly extending members 60. The cross members 58 are attached to the side members 53 by fasteners, such as threaded fasteners 61. It will be understood however, that the cross members 58 can be attached to the side members 53 by any desired means, such as with rivets or by welding. A pivot pin 62 extends between third pivot apertures 63 of the side members 53.

Preferably, the frame 12 is disposed between the side members 53 of the first pivot assembly 52, such that the pivot pin 62 extends through the first pivot apertures 20 of the frame 12. The pivot pin 62 thereby pivotally attaches the first pivot assembly 52 to the side walls 16 of the frame 12 about the second pivot axis P2. Additionally, the pivot pin 62 further pivotally attaches the strut 42 to the side walls 16 of the frame 12 about the second pivot axis P2.

A locking mechanism 64 is provided to allow an operator to limit movement of the first pivot assembly 52 relative to the frame 12. Preferably, the locking mechanism 64 includes a pair of handle portions 65 having a threaded rod 66 extending inwardly therefrom. The threaded rods 66 extend through the slots 57 and are preferably received in corresponding threaded apertures 67 formed in the side walls 16 of the frame 12, as best shown in FIG. 2. Rotating the handle portions 65 in a first direction loosens and thereby unlocks the locking mechanism 64, allowing the first pivot assembly 52 to pivot relative to the frame 12. Rotating the handle portions 65 in a second direction tightens and thereby locks the locking mechanism 64, preventing the first pivot assembly 52 from moving relative to the frame 12. Any other mechanism suitable for limiting movement of the first pivot assembly 52 relative to the frame 12 can also be used.

Referring now to FIG. 4, a first end 68A of a pulling chain or cable 68 can be attached to the connecting aperture 36 of the piston rod 33. A second end 68B of the cable 68 is attached to a crossbeam 70 disposed against an outside edge of the second end 11B of the first pipe 11. Optionally, as shown in FIG. 4, a pulling tube 72 can be attached to the piston rod 33 to extend the length of the piston rod 33. The pulling tube 72 includes an elongated tubular body 72A having connecting apertures 73 formed at the ends thereof. Preferably, the pulling tube 72 is attached to the piston rod 33 with fasteners, such as pins or threaded fasteners. It will be understood however, that any other desired fastener can be used. As shown in the exemplary embodiment illustrated in FIG. 4, the first end 68A of the pulling cable 68 can then be attached to a connecting aperture 73 of the pulling tube 72. It will be understood that the pulling tube 72 can have any desired length L1.

Figure 7:
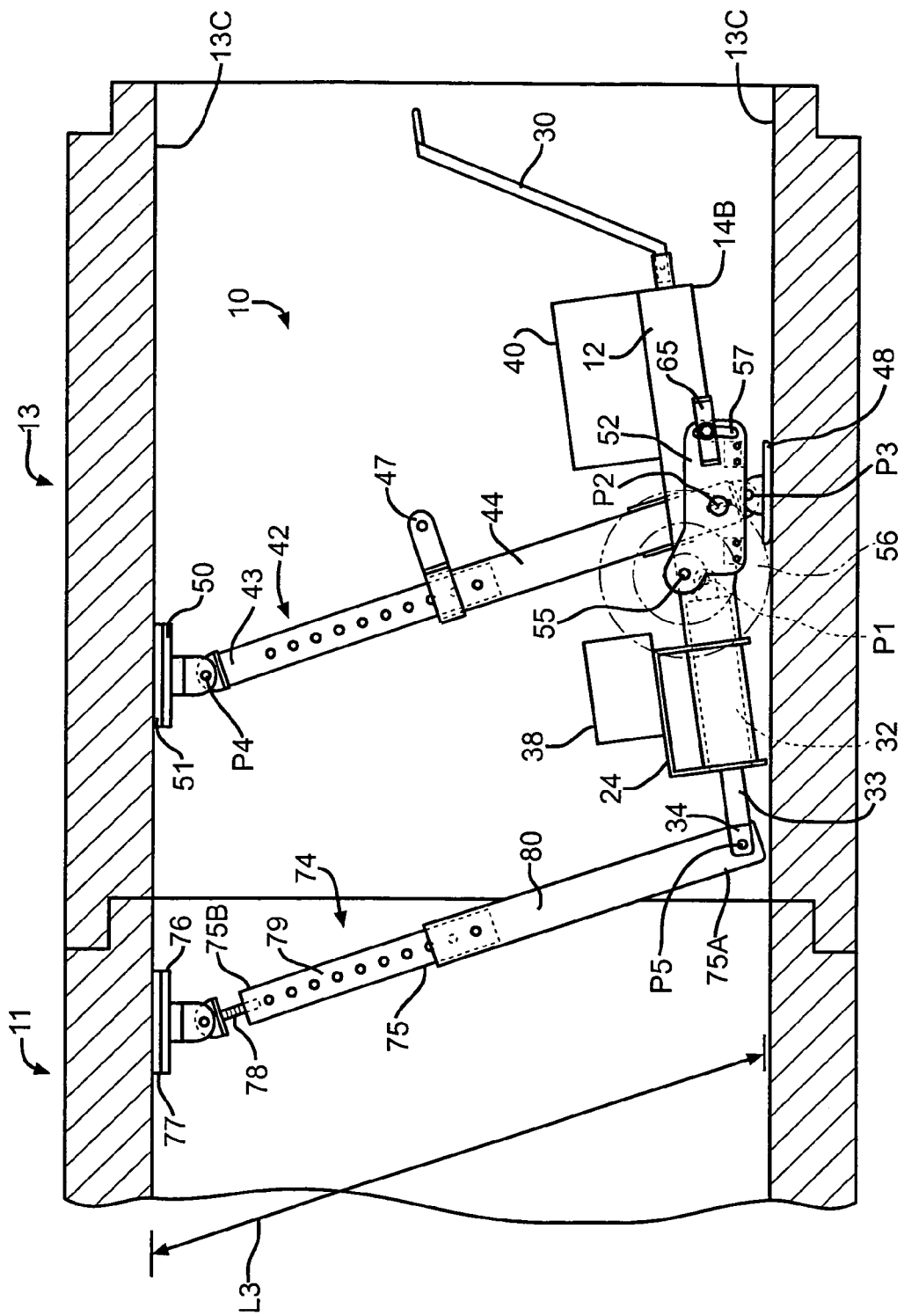
FIG. 7 is an elevational view of the apparatus for pulling pipe illustrated in FIG. 4 showing apparatus and the push-off tube inside a pipe illustrated in cross section.

Referring now to FIG. 7, a release mechanism or push-off tube assembly 74 includes an elongated tubular body 75 having a first end 75A, a second end 75B, and a third shoe 76. The third shoe 76 is substantially identical to the second shoe 50, and is pivotally mounted at the second end 75B of the body 75. The third shoe 76 is preferably formed from steel, such as plate steel within the range of from about ¼ inch to about ⅜ inch thick. It will be understood however, that the third shoe 76 can be formed from any desired thickness of steel and any other desired metals and non-metals. The third shoe 76 includes an outer layer 77 for engaging the inner surface 13C of the second pipe 13. Preferably, the outer layer 77 is a resilient or elastomeric material, such as rubber. If desired, a threaded portion 78 can be disposed between the second end 75B and the third shoe 76 for selectively positioning the third shoe 76 relative to the second end 75B. As shown in FIG. 7, the body 75 includes a first push-off portion 79 slidingly disposed within a second push-off portion 80. If desired, the pulling tube 72 can be used as the second push-off portion 80 of the body 75. Although not illustrated, it will be understood that the push-off tube assembly 74 can also be formed as a single tube.

Figure 3:
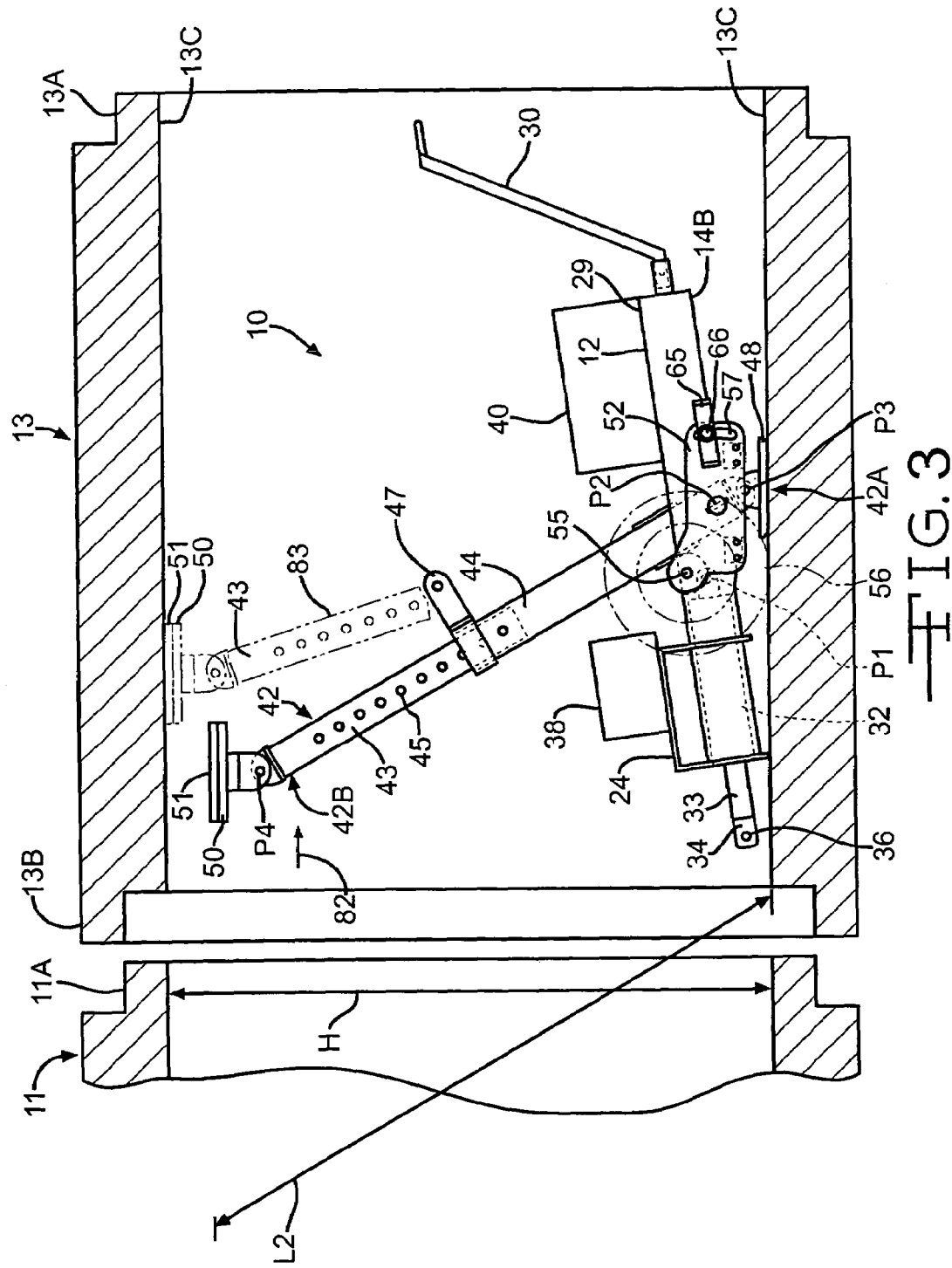
FIG. 3 is an elevational view of the apparatus for pulling pipe illustrated in FIG. 1, showing the apparatus in an engaged position inside a pipe illustrated in cross section.

The pipe puller 10 is movable between an engaged position, as shown in FIG. 3, and a travel position, as shown in FIG. 1. In the engaged position, one or both of the first and second ends 42A and 42B of the strut 42 is in contact with the inner surface 13C of the stationary second pipe 13. In the travel position, the strut 42 is not in contact with the inner surface 13C of the stationary second pipe 13.

In operation, the pipe puller 10 is moved to the travel position, and disposed within the stationary second pipe 13, as shown in FIG. 1. Preferably, the first shoe 48 of the pipe puller 10 is substantially longitudinally centrally disposed within the second pipe 13. It will be understood however, that the pipe puller 10 can be disposed at any desired location within the second pipe 13.

The pair of handle portions 65 is then rotated counterclockwise (as viewed in FIG. 1) so as to unlock the locking mechanism 64 and loosen the first pivot assembly 52 relative to the frame 12. An upward force is then applied to the frame 12, preferably at the frame handle 30, thereby causing the frame 12 to pivot relative to the first pivot assembly 52 about the second pivot axis P2. The rods 66 are caused to slide upwardly in the slots 57, and the first shoe 48 is moved into contact with the inner surface 13C of the second pipe 13, thereby moving the pipe puller 10 to the engaged position, as best shown in FIG. 3.

As best shown in FIG. 3, the upper section 43 of the strut 42 is then extended upwardly such that the strut 42 has a length L2 greater than the height H of the second pipe 13. Preferably, the strut 42 has a length L2 within the range of from about 3 percent to about 7 percent greater than the height H of the second pipe 13. More preferably, the length L3 is within the range of from about 4 percent to about 6 percent greater than the height H of the second pipe 13. Most preferably, the length L2 is about 5 percent greater than the height H of the second pipe 13.

The motor of the power unit 38 is then actuated to extend the piston rod 33 of the hydraulic jack 32 outwardly (toward the first pipe 11 as viewed in FIG. 3). Preferably, the power unit 38 is actuated using a wireless remote controller. As best shown in FIG. 4, the first end 68A of the pulling cable 68 is then attached to the connecting aperture 73 of the pulling tube 72. The second end 68B of the cable 68 is attached to the crossbeam 70 disposed against the outside edge of second end 11B of the first pipe 11. If desired, the pulling cable 68 can be attached to the piston rod 33 of the hydraulic jack 32.

A force is then applied to the strut 42 in the direction of the arrow 82 (rearwardly as viewed in FIG. 3) such that the outer layer 51 of the second shoe 50 frictionally engages the inner surface 13C of the second pipe 13, thereby defining a first operating position of the pipe puller 10 as shown by a phantom line 83. The motor of the power unit 38 is then actuated so as to cause the piston rod 33 to retract within the hydraulic jack 32, thereby moving the cable 68 toward the pipe puller 10 such that there is substantially no slack in the cable 68. It will be understood that such a force can be applied by any suitable means, such as by hand. The power unit 38 is again actuated, preferably using the wireless remote controller, to cause the piston rod 33 to retract within the hydraulic jack 32, thereby tightening the cable 68. The retracting of the piston rod 33 further causes the first shoe 48 of the strut 42 to slide slightly toward the first pipe 11 (forwardly as viewed in FIG. 3), wedging the strut 42 against the inner surface 13C of the second pipe 13, and preventing further movement of the pipe puller 10 toward the first pipe 11. Continued retraction of the piston rod 33 will then pull the first pipe 11 toward the second pipe 13 such that second end 13B of the second pipe 13 and the first end 11A of the first pipe 11 become sealingly engaged.

After the first and the second pipes 11 and 13 are pulled together, the power unit 38 is again actuated, to again slightly extend the piston rod 33 outwardly, and thereby creating slack or loosening the cable 68. The cable 68 is then removed from the piston rod 33, and the push-off tube assembly 74 is pivotally attached to the piston rod 33 about a fifth pivot axis P5, as best shown in FIG. 7. Preferably, the push-off tube assembly 74 has a length L3 greater than the height H of the second pipe 13. Preferably, the push-off tube assembly 74 has a length L3 within the range of from about 3 percent to about 7 percent greater than the height H of the second pipe 13. More preferably, the length L3 is within the range of from about 4 percent to about 6 percent greater than the height H of the second pipe 13. Most preferably, the length L3 is about 5 percent greater than the height H of the second pipe 13.

The push-off tube assembly 74 is then pivoted about the fifth pivot axis P5, such that the outer layer 77 of the third shoe 76, and the first end 75A of the tubular body 75 engage the inner surface 13C of the second pipe 13. The power unit 38 is then actuated, to again extend the piston rod 33 outwardly. The outward movement of the piston rod 33 causes the first end 75A of the push-off tube assembly 74 engage the inner surface 13c of the second pipe 13 and to slide slightly toward the first pipe 11 (forwardly as viewed in FIG. 7), wedging the push-off tube assembly 74 against the inner surface 13C of the second pipe 13. Continued extension of the piston rod 33 against the wedged push-off tube assembly 74 will cause the pipe puller 10 to move rearwardly (as viewed in FIG. 7) thereby releasing the strut 42 from its wedged position.

A downward force can then applied to the frame 12, preferably at the frame handle 30, thereby causing the frame 12 to pivot relative to the first pivot assembly 52 about the second pivot axis P2. The rods 66 are caused to slide downwardly in the slots 57, thereby moving the pipe puller 10 to the travel position, as best shown in FIG. 1. The pair of handle portions 65 are then rotated counterclockwise (as viewed in FIG. 1) so as to lock the locking mechanism 64 and lock the first pivot assembly 52 relative to the frame 12.

It will be understood that any desired number of first pipes 11 can be pulled by the pipe puller 10 when the pipe puller 10 is in the engaged position in a stationary second pipe 13.

Figure 8:
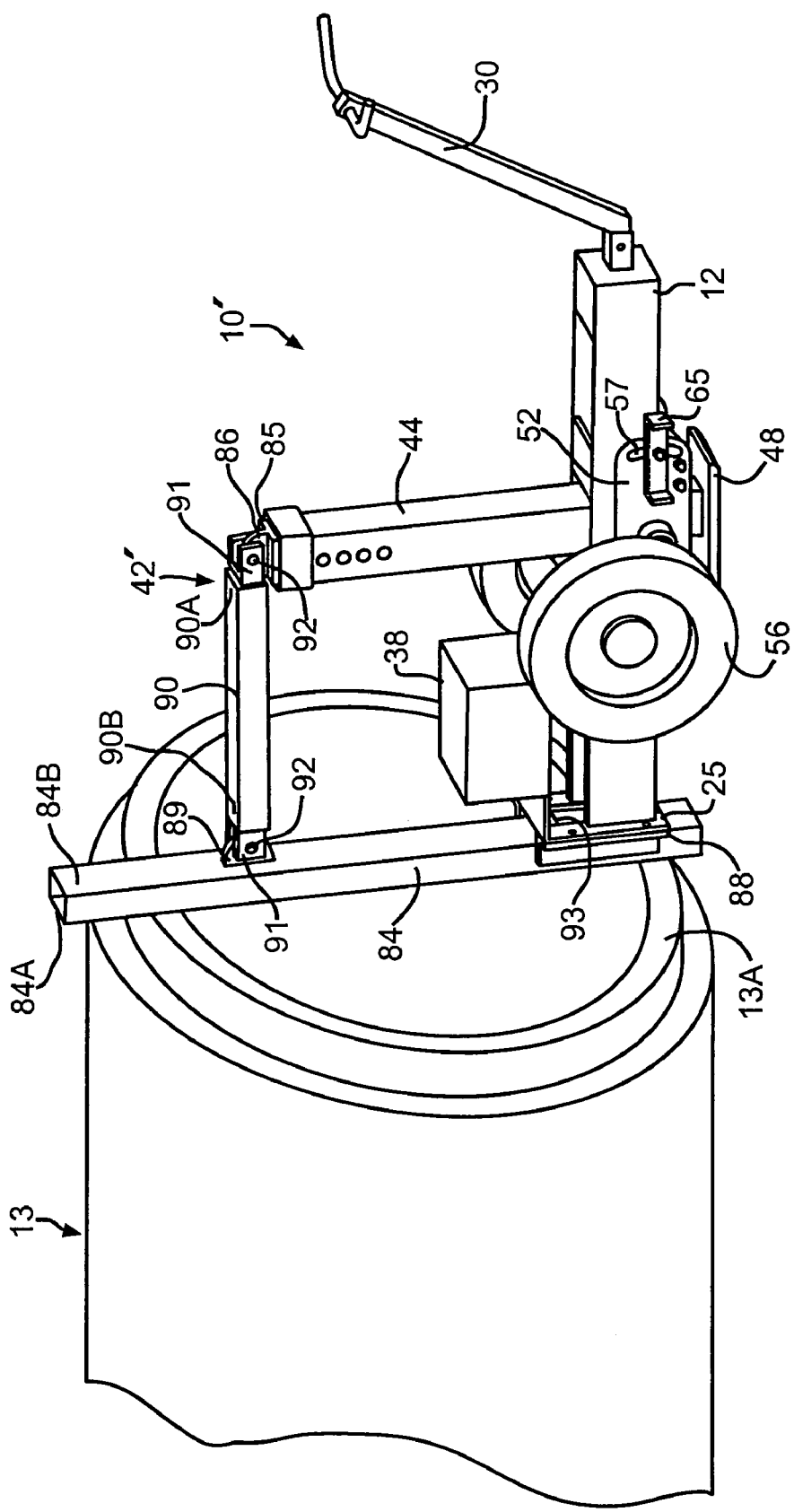
FIG. 8 is a perspective view of the apparatus for pulling pipe illustrated in FIG. 1 showing the apparatus in a second operating configuration adjacent an end of a pipe.

Referring now to FIG. 8, and using like reference numbers to indicate corresponding parts, the pipe puller 10' is illustrated in a second operating position in accordance with the present invention.

The strut 42' of the pipe puller 10' includes the lower section 44 and a substantially vertical engagement section 84. It will be understood however, that the engagement section 84 could be substantially horizontal, or disposed at any desired angle relative to the lower section 44. A connecting section 85 is disposed within the upper end of the lower section 44 and includes a substantially flat first connecting member 86 extending upwardly therefrom. Preferably, the first connecting member 86 includes an aperture (not shown). The engagement section 84 is preferably an elongated tube having a substantially rectangular cross-section. The engagement section 84 includes an engagement surface 84A and a mounting surface 84B. A substantially rectangular opening 93 is formed in a lower end of the engagement section 84. Second mounting flanges 88 extend outwardly from the mounting surface 84B adjacent the opening 93. A substantially flat second connecting member 89 extends rearwardly from the mounting surface 84B, and preferably includes an aperture (not shown) therethrough.

The second mounting flanges 88 are disposed adjacent the first mounting flange 25 of the frame 12 and attached thereto with fasteners, such as threaded fasteners, or rivets. It will be understood that if permanent mounting is desired, the second mounting flanges 88 can be welded to the first mounting flange 25.

A substantially horizontal upper section 90 includes a first end 90A and a second end 90B. The first and second ends 90A and 90B include outwardly extending ears 91 having attachment apertures 92 formed therein. The horizontal upper section 90 extends between the first connecting member 86 of the connecting section 85, and the second connecting member 89 of the engagement section 84. Preferably, fasteners, such as threaded fasteners, extend through the apertures 92, thereby attaching the horizontal upper section 90 to the engagement section 84 and to the connecting section 85. Preferably, the horizontal upper section 90 is disposed at about 90 degrees relative to the lower section 44. As used herein, about 90 degrees can be any angle within the range of from about 80 degrees to about 100 degrees. Although not shown in FIG. 8, the piston rod 33 extends forwardly through the opening 93.

In operation, the pipe puller 10' is moved adjacent the first end 13A of the stationary second pipe 13, such that the engagement surface 84A of the engagement section 84 contacts the outside edge of the first end 13A. A first pipe, such as the first pipe 11 illustrated in FIG. 4, can then be pulled toward the second pipe 13 as described herein above.

Figure 9:
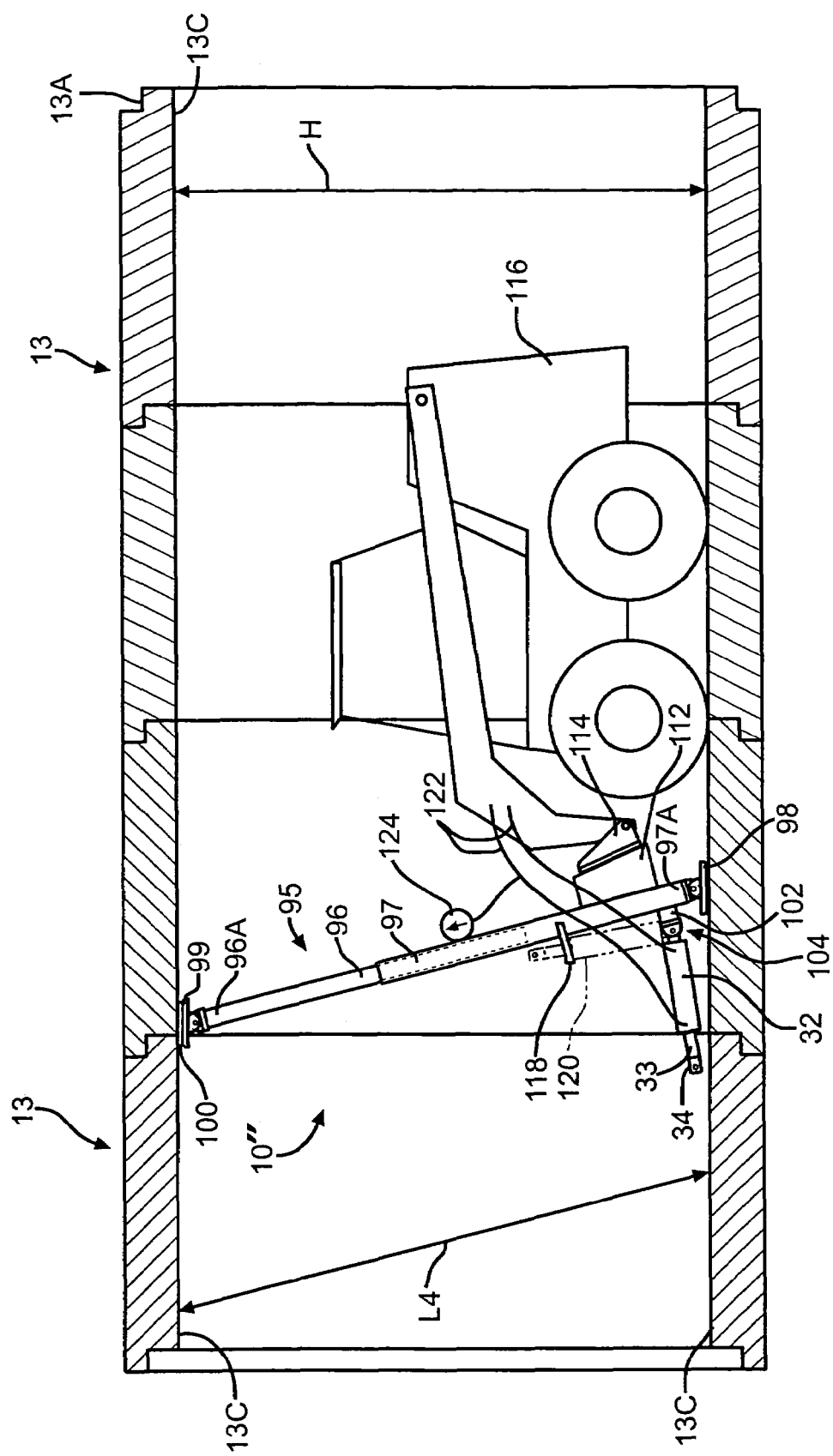
FIG. 9 is a an elevational view of a second embodiment of an apparatus for pulling pipe in accordance with the present invention, with apparatus inside a plurality of pipes illustrated in cross section.

Referring now to FIGS. 9, 10, and 10A, a second embodiment of the pipe puller is illustrated generally at 10". The pipe puller 10" includes a strut 95 having an upper section 96 and a lower section 97. A substantially horizontal first attachment member 102 extends outwardly (forwardly as viewed in FIGS. 9 and 10A) from a lower portion of the lower section 97. In the illustrated embodiment, the strut 95 is telescoping such that the upper section 96 is slidably disposed within the lower section 97. The strut 95 may be formed from steel, such as plate steel within the range of from about ¼ inch to about ⅜ inch thick. It will be understood however, that the strut 95 can be formed from any desired thickness of steel and any other desired metals, metal alloys, and non-metals.

A first shoe 98 is pivotally mounted at the distal end 97A of the lower section 97. The first shoe 98 may be formed from steel, such as plate steel within the range of from about ¾ inch to about 1 inch thick. It will be understood however, that the first shoe 98 can be formed from any desired thickness of steel and any other desired metal, metal alloys, and non-metals.

A second shoe 99 is pivotally mounted at the distal end 96A of the upper section 96. The second shoe 99 may be formed from steel, such as plate steel within the range of from about ¾ inch to about 1 inch thick. It will be understood however, that the second shoe 99 can be formed from any desired thickness of steel and any other desired metals, metal alloys, and non-metals. The second shoe 99 includes an outer layer 100 for engaging an inner surface 13C of the second pipe 13. The outer layer 100 may be a resilient or elastomeric material, such as rubber. Any other desired resilient or elastomeric material may also be used.

A second pivot assembly 104 includes a pair of outwardly (to the right as viewed in FIG. 10A) extending ears 106 and a substantially vertical second attachment member 108. The second pivot assembly 104 may be pivotally attached to the first attachment member 102 by a substantially vertical pivot pin 110 for substantially horizontal pivotal movement, as shown by the arrows 111, of the second pivot assembly 104. The second attachment member 108 may be pivotally attached to the first end 32A of the hydraulic jack 32 by a substantially horizontal pivot pin 110 for substantially vertical pivotal movement, as shown by the arrows 113, of the hydraulic jack 32.

In the embodiment illustrated in FIG. 9, the strut includes a mounting frame or plate 112 attached to a rearwardly facing surface (as viewed in FIG. 9) of the lower section 97 of the strut 95. The plate 112 may be attached to the lower section 97 by any desired means, such as by welding. It will be understood, however, that the plate 112 may be attached to the lower section 97 by any other desired means, such as with threaded fasteners. In the illustrated embodiment, the plate 112 is shown as having a substantially trapezoidal shape when viewed in elevation. It will be understood, however, that the plate 112 may have any desired shape. For example, the plate 112 may be a substantially flat plate. The plate 112 may be formed from any desired material, such as plate steel. In one embodiment, the plate 112 is formed from plate steel within the range of from about ¼ inch to about one inch thick. Any other desired thickness of steel, and any other desired metals, metal alloys, and non-metals can also be used.

In the embodiment illustrated in FIG. 9, the plate 112 is attached to an articulating arm 114 of a wheeled or tracked construction apparatus or vehicle. An example of such a vehicle is a skid loader 116, as shown in FIGS. 9 and 10. The plate 112 may be attached to the articulating arm 114 by any desired fasteners, such as threaded fasteners or quick connectors.

In the illustrated embodiment, a hydraulic jack latch 118 extends forwardly (to the left as viewed in FIG. 9) from the lower section 97 for latching the hydraulic jack 32 in a substantially vertical or upright position when the hydraulic jack 32 is not in use, such as shown by the phantom line 120 in FIG. 9.

Hydraulic conduits 122 may be provided to fluidly connect the hydraulic jack 32 to a source of hydraulic pressure within the skid loader 116. If desired, a hydraulic pressure gauge 124 may be fluidly connected to one or more of the hydraulic conduits 122 and attached to the strut 95.

In operation, the pipe puller 10" may be attached to a skid-loader 116, and disposed within a stationary second pipe 13, as shown in FIG. 9. In the illustrated embodiment, the upper section 96 of the strut 95 is then extended upwardly such that the strut 95 has a length L4 greater than the height H of the stationary second pipe 13. In one embodiment, the strut 95 has a length L4 within the range of from about 3 percent to about 7 percent greater than the height H of the second pipe 13. In another embodiment, the length L4 is within the range of from about 4 percent to about 6 percent greater than the height H of the second pipe 13. In another embodiment, the length L4 is about 5 percent greater than the height H of the second pipe 13. The skid loader operator may then pivot the strut 95 such that the first shoe 98 slides away from the skid loader 116, and the outer layer 100 of the second shoe 99 frictionally engages the inner surface 13C of the stationary second pipe 13, thereby wedging the strut 95 against the inner surface 13C.

In the illustrated embodiment, hydraulic pressure is supplied by the skid loader 116 to extend the piston rod 33 of the hydraulic jack 32 outwardly (to the left as viewed in FIG. 9) toward the a pipe (not shown in FIG. 9, but substantially identical to the first pipe 11 illustrated in FIGS. 1, 3, and 10) to be pulled. The pipe to be pulled can then be pulled toward the stationary second pipe 13 as described herein above.

After a desired number of pipes have been pulled together, a force may be applied to the strut 95 by the skid loader 116 to cause the first shoe 98 to slide slightly rearwardly (to the right as viewed in FIG. 9), thereby releasing the strut 95 from its wedged position.

Referring now to FIG. 10, the pipe puller 10″ is illustrated in a second operating position in accordance with the present invention. In the second operating position, the strut 95 of the pipe puller 10″ is moved to substantially vertical position, as shown in FIG. 10. The pipe puller 10″ is then moved adjacent the first end 13A of the stationary second pipe 13, such that a forwardly facing surface 95A of the strut 95 contacts the outside edge of the first end 13A. In operation, a first pipe 11 can then be pulled toward the second pipe 13 with the hydraulic jack 32 as described herein above.

It will be understood that more than one of the struts 95 described above may be attached to the articulating arm 114 of the skid loader 116 and used simultaneously. For example, a pair of struts 95 may be attached to the articulating arm 114 of the skid loader 116. The structure and operation of each strut 95 of such a pair of struts may be substantially identical to the structure and operation of the strut 95 illustrated in FIGS. 9, 10, and 10A, and described above. It will be further understood that the plurality of struts 95 may be attached to a single mounting plate 112. Alternately, a plurality of the struts 95, each having a mounting plate 112, may be attached to the articulating arm 114 of the skid loader 116 as described above.

The principle and mode of operation of this invention have been described in its various embodiments. It should be noted, however, that this invention may be practiced otherwise than as specifically illustrated and described without departing from its scope.

What is claimed is:

1. In combination, a multi-purpose construction vehicle and a compact pipe pulling apparatus for pulling a first pipe into contact with a second pipe, the combination comprising:
   a multi-purpose construction vehicle maneuverable and operable by a vehicle driver, said vehicle including an articulating arm controllable by the driver, said articulating arm including a multi-purpose tool mount; and
   a compact pipe pulling apparatus including:
      a securing strut for engagement with the second pipe;
      a force generating mechanism mounted relative to said strut and adapted to be coupled to the first pipe to pull the first pipe into contact with the second pipe; and
      an attachment member mounted to said strut and releasably connected to said multi-purpose tool mount for enabling the vehicle driver to move said pipe pulling apparatus into an operative position relative to the second pipe.

2. The combination according to claim 1, wherein said vehicle is a skid loader.

3. The combination according to claim 1, wherein said vehicle further includes a source of hydraulic pressure, and wherein said force generating mechanism is a hydraulically operated force generating mechanism mounted relative to said strut and connected to said source of hydraulic pressure on said vehicle.

4. The apparatus according to claim 3, wherein said force generating mechanism is a hydraulic jack.

5. The apparatus according to claim 4, wherein said hydraulic jack includes a first end mounted relative to said strut, and a second end connected to a pulling cable.

6. The combination according to claim 3 wherein said strut has a first end, a second end, and a strut body between said first and second ends, and wherein said combination is movable between a first operating configuration wherein said first and second ends of said strut are in contact with an inner surface of the second pipe, and a second operating configuration wherein a portion of said strut body is in contact with an end of the second pipe.

7. The combination according to claim 1, wherein said pipe pulling apparatus further includes a pivot assembly having a first end and a second end, said first end being attached to said strut and said second end being attached to said force generating mechanism, said pivot assembly connecting said force generating mechanism to said strut, said pivot assembly further being pivotal relative to said strut about a first pivot axis, and pivotal relative to said strut about a second pivot axis.

8. The combination according to claim 1, wherein said strut is a telescoping strut extendable for engagement with an inner surface of the second pipe.

9. The combination according to claim 8, wherein said telescoping strut is extendable for engagement with an exterior end surface of the second pipe.

* * * * *